INVENTORS
WILLIAM B. GOGARTY
HAROLD P. MEABON
BY Richard C. Stilbourg Jr.

INVENTORS
WILLIAM B. GOGARTY
HAROLD P. MEABON
BY Richard C. Wilson

INVENTORS
WILLIAM B. GOGARTY
HAROLD P. MEABON
BY

United States Patent Office

Re. 27,199
Reissued Oct. 19, 1971

27,199

PROCESSES FOR THE SIMULTANEOUS DISPLACEMENT OF PETROLEUM AND WATER IN FORMATIONS

William B. Gogarty, Littleton, Colo., and Harold P. Meabon, Houston, Tex., assignors to Marathon Oil Company, Findlay, Ohio Original No. 3,443,635, dated May 13, 1969, Ser. No. 665,763, Sept. 6, 1967. Application for reissue May 18, 1970, Ser. No. 48,757
Int. Cl. E21b *43/22, 47/00*
U.S. Cl. 166—252 32 Claims

Matter enclosed in heavy brackets [ ] appears in the original patent but forms no part of this reissue specification; matter printed in italics indicates the additions made by reissue.

ABSTRACT OF THE DISCLOSURE

Petroleum and water can be simultaneously displaced in formations by determining the oil relative permeability and the water relative permeability both in relation to water saturation of representative rock samples, then calculating the total relative mobility and determining the minimum total relative mobility reasonably likely to be encountered in the formation. A displacing fluid having a mobility [not greater than] *selected in accordance with* the minimum total relative mobility can then be injected into the formation to simultaneously displace, at controlled rate, water and petroleum present in the formation. In tertiary operations transient testing may be utilized in the determination of the minimum total relative mobility. Petroleum is obviously used for lubricating oils, gasolines, coke, etc.

CROSS REFERENCES TO RELATED APPLICATIONS

The present invention is similar in purpose, but somewhat different in technique from S.N. 665,845 filed Sept. 6, 1967, *now U.S. Pat. No. 3,443,636,* by William B. Gogarty and assigned to the assignee of the present invention.

BACKGROUND OF THE INVENTION

Field of the invention

The present invention relates to the field of miscible displacement of petroleum and water from formations. The invention has use in the secondary and also in the tertiary recovery of petroleum from formations. The invention is also useful in cases in which it is desirable to either speed primary production or to enhance a weak natural gas or water drive during primary production. The invention may also be utilized to displace fluids from around well bores, e.g. in modifying the injectivity charactistics of wells and in other well bore treating operations.

Description of the prior art

Various flooding methods for the displacement of petroleum in formations have been developed in the past. These include water floods in which water is injected into the formation to displace oil; thickened water floods in which polymers, e.g. certain polyacrylamides; carboxymethyl celluloses, etc. are used to decrease the mobility of the water and somewhat control the "fingering" generally encountered in ordinary water floods; alcohol floods; emulsion floods; e.g. U.S. 3,208,515 and U.S. 3,261,399; and the relatively new developed soluble oil types of flooding media and processes, e.g. U.S. 3,254,714 and 3,275,075.

As is well known, the total relative mobility of two phases (e.g. oil and water), $M_{o-w}$, flowing in porous petroleum bearing formations is related to both the viscosities of the fluids in place, and also to the characteristics of the individual formation in question, according to the following general formula:

$$M_{o-w}=\frac{k_{ro}}{\mu_o}+\frac{k_{rw}}{\mu_w}$$

where:

$k_{ro}$ is the relative permeability with respect to oil,
$k_{rw}$ is the relative permeability with respect to water.
$\mu_o$ is the viscosity of oil.
$\mu_w$ is the viscosity of the water.

The relative permeabilities, $k_{ro}$ and $k_{rw}$ vary due to variations in water saturation, $S_w$, and rock characteristics from point to point in most reservoirs. Various calculation methods have been suggested for dealing with the individual mobilities of oil and water and their ratios, e.g. those for water flooding discussed in "Secondary Oil Recovery" by C. R. Smith, Chapter 7, pp. 183–235 (Reinhold, 1966). This same text also discusses various methods of miscible flooding and gives methods for the determination of performance of some such miscible floods, e.g. as at pages 357–358.

Most of these calculational methods have been useful for the prediction of recovery rather than for the optimizing of the displacing fluids. In practice, most past flooding operations have not involved simultaneous displacement of water and oil and have merely attempted to keep the viscosity of the flooding agent above that of the oil in place. To the best of our knowledge, no successful method of optimum slug design adaptable to a variety of reservoirs and to a variety of displacing fluids which are capable of simultaneous displacement of water and oil has previously been available.

SUMMARY OF THE INVENTION

The present invention affords new methods for the displacement of petroleum in formations which utilize displacement fluids specifically designed according to new techniques for the optimizing of the displacement fluids to obtain substantially maximum oil recovery without excessive fluid component or pumping costs due to unnecessarily high viscosities of the displacing fluids.

In preferred embodiments, the present invention simultaneously displaces both water and oil in the formation and maintains the total relative mobility of both of the displaced fluids greater than that of the displacing fluid so as to substantially avoid instability under the conditions which are reasonably likely to be encountered in the reservoir.

It is known that the water relative permeability, $k_{rw}$ and the oil relative permeability, $k_{ro}$ vary with water saturation $S_w$ in such a manner that as water saturation increases the relative permeability to water $k_{rw}$ increases while the relative permeability to oil $k_{ro}$ decreases (see, for example, FIGURES 1 to 4). Since the viscosities of the oil and water $\mu_o$ and $\mu_w$, respectively are relatively constant within the reservoir, the total relative oil and water mobility, $M_{o-w}$, in relation to water saturation, reaches a minimum point. That is, starting at a low value of water saturation $S_w$, $M_{o-w}$ will first decrease as $S_w$ increases, and then reach a minimum point and thereafter increase as $S_w$ increases (see, for example FIGURE 5). The present invention therefore utilizes, in certain of its preferred embodiments, the finding that, generally speaking, for any given point in a reservoir containing oil and water, there exists a minimum total relative oil and water mobility $M_{o-w}$. By finding this minimum by determining the $k_{ro}$ and $k_{rw}$ for each of a number of rock samples taken from different points in a reservoir, then selecting the lowest of these minimum values, a minimum total relative oil and water mobility $M_{o-w}$ may be found for any given entire reservoir or portion of a reservoir. It is most important to the present invention that this minimum value to be encountered in the reservoir may be determined without knowing the water saturation at various points within the reservoir. Water saturation at points ahead of the displacing fluid is affected by the displacement process and is, at best, extremely difficult to estimate prior to the initiation of flooding.

Of course, the minimum total relative oil and water mobility $M_{o-w}$ reasonably likely to be encountered in the reservoir may be determined from the minima of the various rock samples by the application of statistical sampling techniques so that the minimum may be selected with various degrees of confidence. Where the taking and testing of a large number of rock samples indicates that the reservoir is relatively homogeneous and that the samples may be taken as representative of the reservoir as a whole, the minimum total relative oil and water mobility as determined from the lowest sample tested may be taken as the minimum for the entire reservoir. Alternatively, it may be found on the basis of experience in particular reservoirs, that the assigning of a factor, e.g. 90% of the lowest total relative oil and water mobility encountered in any sample of a set of samples, provides a mobility having a high degree of confidence that it will not be subceeded at any point in the reservoir. Such experience may permit finding the minimum $M_{o-w}$ for an entire typical reservoir on the basis of even a simple representative rock sample.

Regardless of the method used for determining, with a desired degree of certainty, the minimum total relative oil and water mobility to be encountered within the reservoir, the present invention permits such determination to be made purely from rock and oil and water samples without knowledge of the water saturation at various points within the reservoir during flooding. The present invention then utilizes this minimum total relative oil and water mobility, $M_{o-w}$, as the criteria for the selection or designing of the displacement fluid. Knowing the minimum $M_{o-w}$ to be encountered, and having rock specimens at hand, a displacing fluid, e.g. an alcohol, ketone, aldehyde, soluble oil, or other displacing fluid can be selected to have a mobility less than said minimum total relative mobility to be encountered in the fluids being simultaneously displaced and therefore instabilities can be substantially avoided.

The techniques of the present invention are particularly important with the new micellar and other multi-component displacement fluids which permit careful tailoring of the mobility of the fluid to virtually any desired value. In most such composite fluids there will be a number of formulations which will meet the requirement of not exceeding the total relative oil and water mobility. From these can then be selected the most economic fluid with respect to the cost of its ingredients and the cost of injecting the fluid and moving it through the reservoir. This economic optimization may be readily conventionally accomplished based on the well spacing, formation thickness, oil in place and other factors to be encountered in the reservoir.

Where relatively expensive high efficiency displacement fluids are being utilized, e.g. soluble oils, it will generally be desirable to drive a bank or slug of such displacement materials with a secondary fluid or fluids, e.g. water or water separated from the slug by a mobility buffer, e.g. thickened water or water external emulsion. Since fingering of such secondary fluids through the first bank of high efficiency displacement fluids would seriously detract from the efficiency of the total flooding operations, it is especially desirable that the mobilities of such buffer fluids be maintained below the mobilities of the displacement fluids which they drive. In short, according to the present invention, any number of fluid banks may be injected sequentially, each driving against the one previously injected; so that each (excluding the drive water which is injected last) can have a lower mobility than does the fluid which it drives at the worst point in the reservoir, that is, the point where the total relative oil and water mobility reaches a minimum. The mobilities will preferably be measured at substantially the worst (highest) frontal velocities to be utilized during the injection and recovery process.

Frontal velocities which will be encountered only in relatively small areas of the formation, e.g. near the well bore can be disregarded where warranted by engineering judgment.

Though not absolutely necessary this designing can preferably be accomplished by simply plotting the mobilities of the various displacement banks (as the ordinate) versus the frontal velocities in the range anticipated (as the abscissa) and drawing the minimum total relative oil and water mobility $M_{o-w}$ determined as discussed above, as a straight line parallel to the abscissa (see, for example, FIGURE 6). The various displacement fluids and mobility buffers are then designed to each have a mobility at each frontal velocity which is less than that of the mobility of the preceding fluid at that frontal velocity.

All of the above discussions are based on removal of rock samples from the formation and laboratory determination of the oil relative permeability and water relative permeability by testing such samples. In general, this method will be preferred for primary and secondary recovery and for well treatment operations, but will be less desirable for tertiary recovery.

A particularly preferred method of the present invention for use in tertiary recovery operations is the determination of water relative permeability by transient reservoir testing. As is known, such transient reservoir testing gives results which are indicative of the entire reservoir. This type of testing can be accomplished by either injecting into (or possibly withdrawing from) the reservoir, water at a constant rate with the bottom hole pressure of the well being determined as a function of time.

The geometrical consideration of appropriate plots of the pressure versus time allows determination of a dimensionless group containing the water permeability at residual oil. (See, e.g. Formation Evaluation, Ed. J. Lynch, Harper and Row (1962) pages 284–318.)

Having run transient reservoir tests with water, the determined water permeability (generally expressed in millidarcies) is divided by the rock permeability (measured at 100% liquid saturation) expressed in the same units to arrive at the water relative permeability for the reservoir. Then by referring this value to the values of water permeability at water saturations which correspond to zero oil relative permeability (for example, as in FIGURES 1, 2, 3, and 4) the appropriate pair of relative permeability curves can be selected.

In short, this procedure uses transient reservoir test data to select from relative permeability curves, the one most representative of the reservoir. As before, in the selection of the rock sample having the minimum total relative water and oil mobility, various statistical sampling techniques or an arbitrary 90% or other factor, can be utilized in order to determine the minimum mobility reasonably likely to be encountered in the reservoir. The slug, or bank of displacing fluid can then be designed to have a mobility less than this minimum value according to the procedures described above.

DESCRIPTION OF THE PREFERRED EMBODIMENTS

Representative rock samples are obtained from a reservoir in which recovery operations are to be conducted. Each of these rock samples is flow tested in the laboratory with specimens of the formation water and the oil in place. The water relative permeability $k_{rw}$ and the oil relative permeability $k_{ro}$ are determined by conventional laboratory methods. (See e.g. Petroleum Reservoir Engineering Amyx Bass and Whiting, McGraw-Hill (1960), pages 174–202.) FIGURES 1 through 4 are plots (from four samples representative of the reservoir rock) of the water relative permeability and the oil relative permeability versus water saturation expressed in percent of pore space for water saturations from about 20 to about 70%, a range which encompasses the water saturations which can be encountered during flow in the reservoir.

Figure 7:
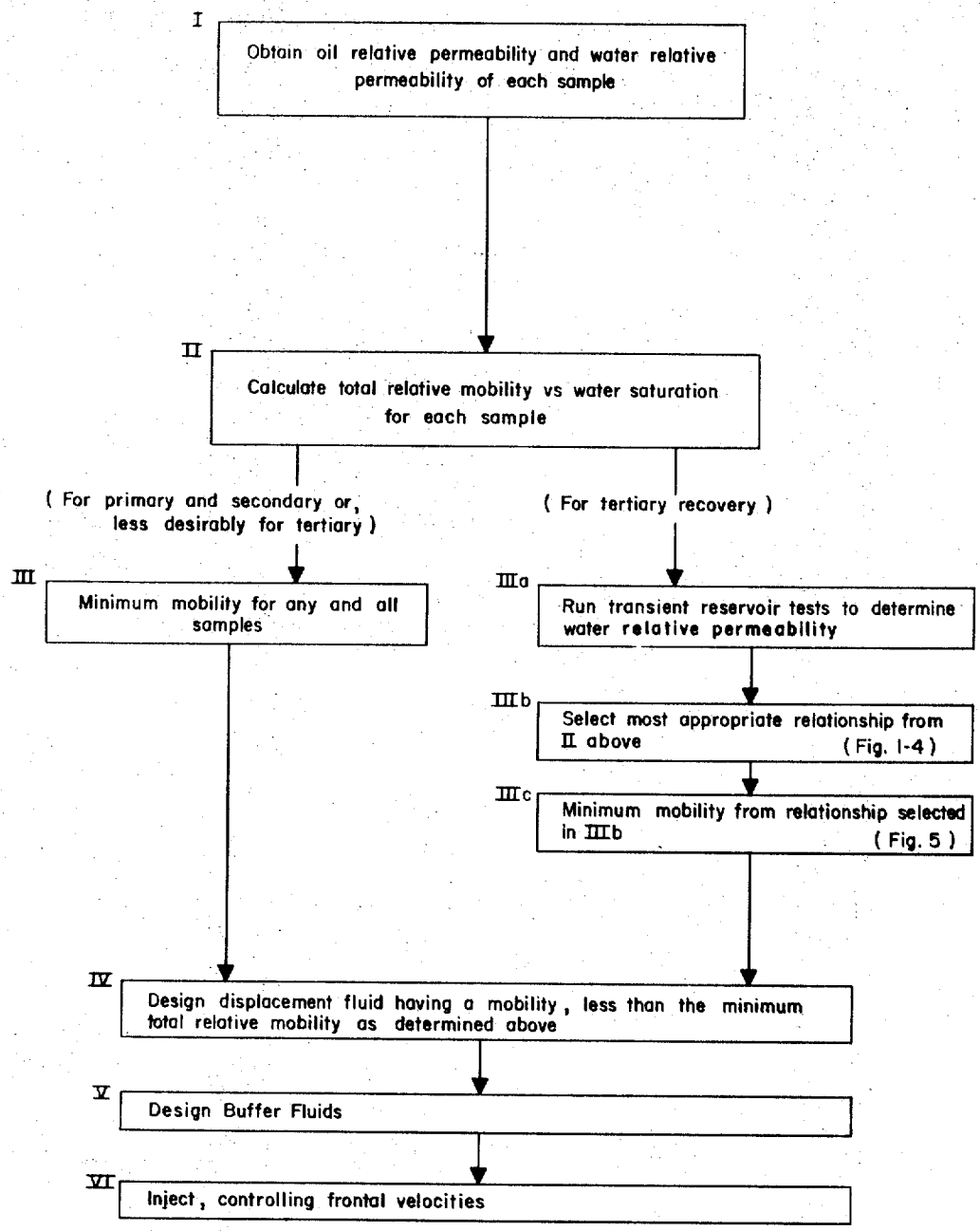
FIGURE 7 is a block diagram of the steps followed in two preferred embodiments of the present invention.

In FIGURE 7, a block diagram of the steps in two preferred embodiments of the present invention, the preceeding is shown as step I.

The viscosity of the formation water and the oil in place are determined (taking a conservatively high value if these viscosities vary from point to point in the reservoir). From this and the results of step I above, the total relative water and oil mobility $M_{o-w}$ is calculated in relation to water saturation using the equation given previously in this specification. This step is shown as step II in FIGURE 7 and the results for each of the four samples used in step I above is shown as a separate curve in FIGURE 5.

Example I.—Secondary recovery operations

In this example, FIGURES 1–5 are used to illustrate the rock properties of a reservoir which has not undergone secondary recovery.

The next step is to choose the minimum value of $M_{o-w}$ likely to be encountered in the reservoir. While conventional statistical sampling techniques may be utilized as mentioned above, to determine this minimum value to any desired degree of certainty, in this exemplary situation, the rock samples are assumed to be representative of the formation and the minimum mobility encountered in the samples taken as a group is reasonably certain to be the minimum mobility to be encountered in the reservoir.

Figure 1:
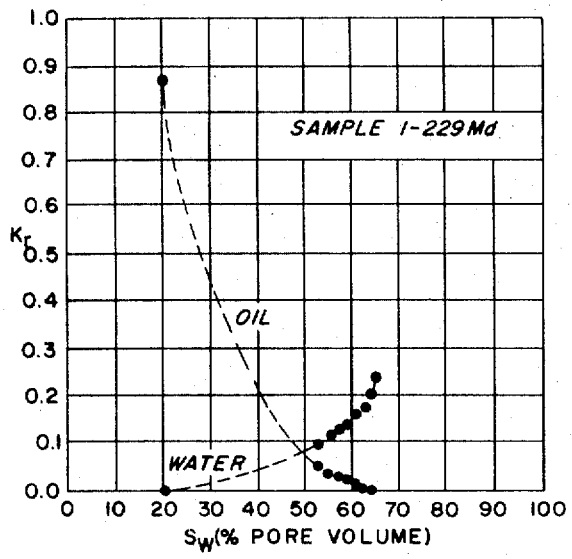
FIGURES 1 through 4 show plots of relative permeability, $k_r$, versus water saturation $S_w$, with oil and water permeabilities plotted separately on each graph, and with each graph representing a different rock sample obtained from a single reservoir.
Figure 2:
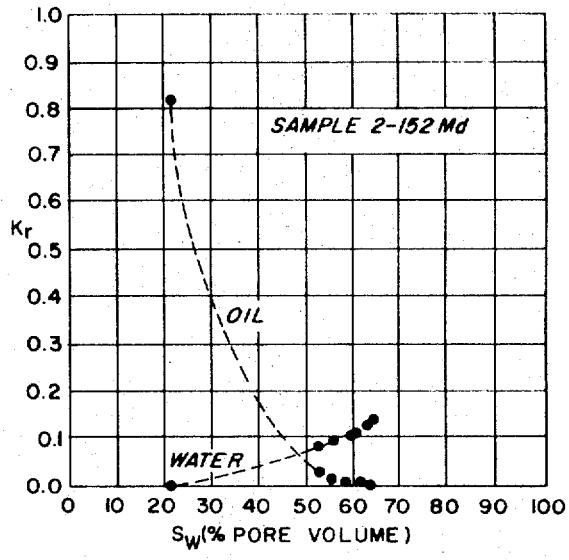
Figure 3:
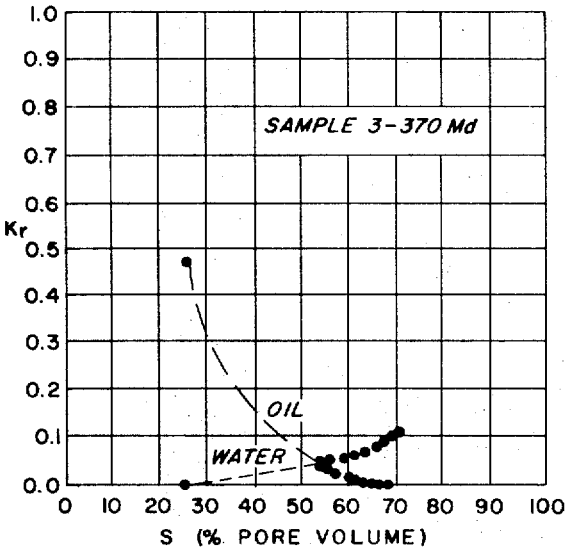
Figure 4:
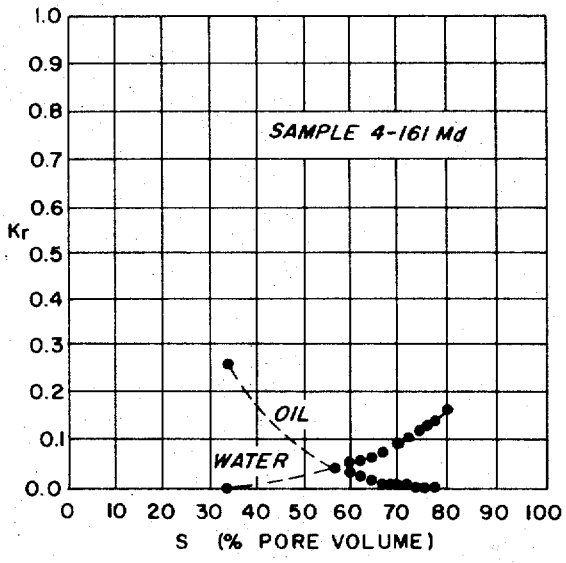
Figure 5:
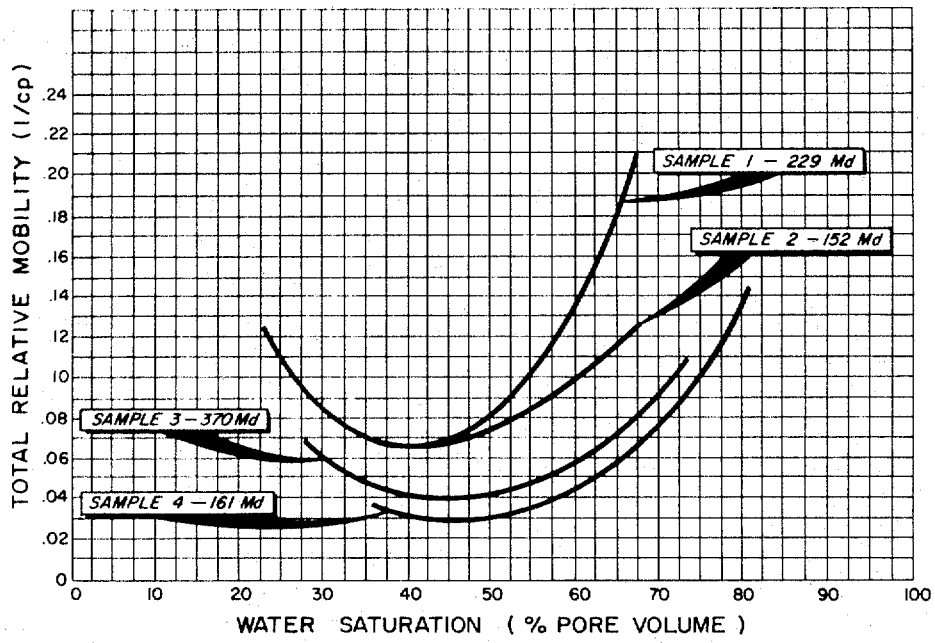
FIGURE 5 is a graph of total relative mobility $M_{o-w}$ (expressed in reciprocal centipoises) versus water saturation, $S_w$, with a separate curve for each of the rock samples utilized in FIGURES 1 through 4, somewhat extrapolated.

The next step, shown as step III in FIGURE 7, is to select the minimum total relative mobility for the lowest of the total relative mobility versus water saturation curves of FIGURE 5. This value, 0.029 for the present embodiment as shown in FIGURE 5 on the curve representing sample 4, is the lowest combined water and oil mobility which can reasonably be expected to be encountered in the reservoir.

The next step, step IV in FIGURE 7, is the design of a displacement fluid which has a mobility lower than the 0.029 minimum total relative mobility determined above in order to assure substantial freedom from instability in the flooding operation. In the present embodiment a slug of soluble oil is to be followed by a mobility buffer fluid consisting of water thickened with certain partially hydrolyzed polyacrylamides of the sort marketed by the Dow Chemical Company under the designation "Dow Pusher" and frequently used in conventional thickened water flooding operations. The mobility of the soluble oil displacement fluid is adjusted by varying the composition of the soluble oil by trial and error and repeatedly determining its mobility in a rock sample, preferably in the sample in which the minimum $M_{o-w}$ was previously determined. Where the effect of the various ingredients on the mobility of the soluble oil has been previously studied, empirical charts may be readily constructed to assist in the design of the soluble oil. Where a variety of soluble oil compositions will all meet the requirement of mobility less than the above determined total relative water and oil minimum mobility, economic considerations will generally determine the particular composition to be chosen.

Figure 6:
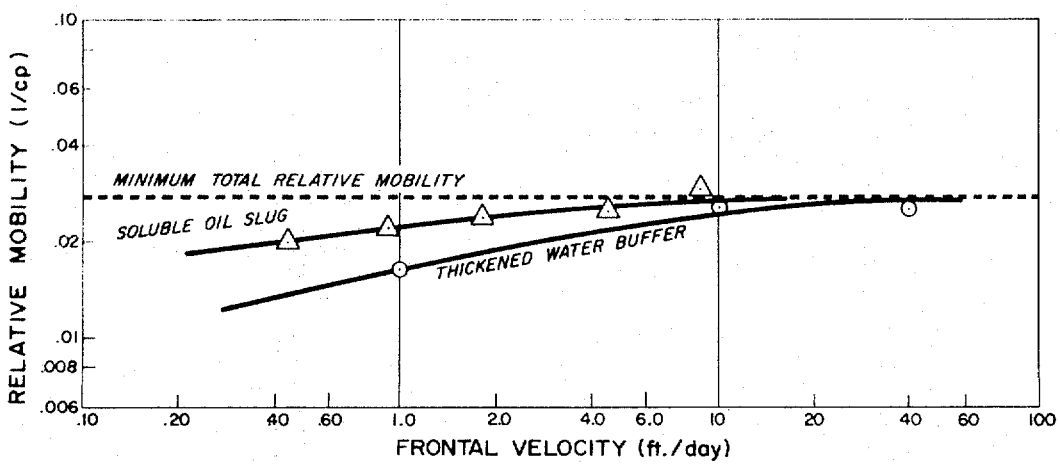
FIGURE 6 is a plot of relative mobility (in reciprocal centipoises) versus frontal velocity (in feet/day) for each of the following, oil and water; an exemplary soluble oil slug; and an exemplary thickened water buffer which contacts the soluble oil slug.

As shown in FIGURE 6, the mobility of the soluble oil bank is determined at each of the frontal velocities to be encountered in the actual flooding operation. The soluble oil of the present embodiment has a composition by volume as follows:

| | Percent |
|---|---|
| Petroleum sulfonate | 10.3 |
| Isopropyl alcohol | 0.4 |
| Crude column overhead hydrocarbons | 57.2 |
| Water | 32.1 |

As can be seen from FIGURE 6, the soluble oil is chosen because the mobilities on the soluble oil mobility curve are in all cases, less than the straight line horizontal and parallel to the frontal velocity abscissa which represents the total relative oil and water minimum mobility as determined above. It is permissible that the soluble oil mobility curve eventually rise above the minimum $M_{o-w}$ curve so long as the point of intersection is outside of the range of frontal velocities to be encountered in the formation.

Similarly, the thickened water is adjusted to a composition of approximately 2400 parts per million by weight polyacrylamide yielding the lower curve shown in FIGURE 6. This curve is also proper inasmuch as it is at all points below the mobility curve for the soluble oil displacing fluid which will precede the thickened water. If more than a two bank displacement fluid system is desired, additional banks may be designed, each having a mobility curve lower than the fluid previously injected at each frontal velocity to be encountered in the operation, and these can then be followed by drive water.

The soluble oil material is then injected into an injection well located in the formation from which the rock samples 1–4 were taken. The quantity of soluble oil injected will generally be based on the distance which the soluble oil slug or bank is expected to displace the petroleum. Conventional techniques of slug sizing, well spacing, and line drive techniques can be employed with the present invention. In most cases, petroleum in place will be displaced toward, and eventually withdrawn from, a production well located within the formation.

Example II.—Tertiary recovery operations

In Example II, FIGURES 1–5 are taken as illustrative of a reservoir which has previously undergone extensive waterflood operations.

Referring again to FIGURE 7, Example II is the case of tertiary recovery operations in which use is made of transient reservoir tests as mentioned above. From these conventionally conducted transient tests is determined the water relative permeability at zero oil relative permeability (step IIIa). Note that the water relative permeability corresponding to the actual water saturation of the reservoir would be used if the oil saturation is not residual (that is, if the water flood had not removed substantially all oil displaceable by water).

In step IIIb the water relative permeability (at zero oil relative permeability in this Example II) is used to select the most appropriate of the curves determined in step II just as discussed in the previous embodiment. The curves are selected by examining the value of $k_{rw}$ at the point where $k_{ro}$ equals zero in each of FIGURES 1 through 4, representing rock samples 1 through 4 respectively. For example, in the present embodiment the transient reservoir tests of step IIIa determine the water relative permeability to be 0.21 at the zero oil relative permeability point. Thus, FIGURES 1–4 indicate that the curve determined from sample 1 most closely fits the results of the transient reservoir tests and therefore may be taken as being most representative of the reservoir as a whole. It should be noted that interpolation between the various sample curves might be useful, or in some cases, it may be necessary to obtain additional rock samples in order to find one sufficiently closely representing the reservoir as a whole.

The next step, shown as step IIIc of FIGURE 7, is to take the minimum total relative oil and water mobility from FIGURE 5 determined by step II just as described in the preceding embodiment and utilizing the curve of the sample most representative of the reservoir (or any interpolated curve between the samples). This value is thus found to be about 0.067 for the curve of sample 1 in FIGURE 5 of the present embodiment.

Thereafter, the design of the displacement fluid step IV of FIGURE 7 is conducted as described in the previous embodiment and so also is the design of any mobility buffer fluids which follow the displacement fluid (step V in FIGURE 7).

The injection itself shown as step VI in FIGURE 7 is done according to established principals of petroleum well bore treatment and recovery, with care being taken to maintain the frontal velocities of the fluids at rates in the range of those utilized in the preceding steps.

The present invention should not be limited to the above illustrative examples and the claims should be considered as including all of the wide variety of modifications and variations which will be made obvious to those skilled in the art upon a reading of the specification.

For example, fluids for use with the present invention may be thickened by any of the many known viscosity control agents, including without limitation, partially hydrolyzed polyacrylamides, sugar, glycerin, starches, and carboxymethyl cellulose, so long as these are selected in accordance with the characteristics of the particular reservoir.

What is claimed is:

1. A process for the simultaneous displacement of petroleum and water in formations bearing petroleum and water and having at least one injection means in said formation, comprising in combination the steps of:

(a) determining the oil relative permeability relative to water saturation of at least one rock sample reasonably representative of the structure of the formation, (b) determining the water relative permeability in relation to water saturation of such samples, (c) calculating the total relative mobility of water and oil in relation to water saturation for each such sample, (d) determining from the mobilities of said samples the minimum total relative mobility reasonably likely to be encountered in the formation, (e) preparing a displacing fluid having a relative mobility not greater than said minimum total relative mobility under the conditions prevailing in the formation, injecting said displacement fluid into said at least one injection means so as to simultaneously displace water and petroleum present in the formation, said injection being controlled at such rates as to maintain the relative mobility of said displacement fluid below said minimum total relative mobility at substantially all points within said formation.

2. The process of claim 1 wherein said displacement fluid comprises a slug of soluble oil.

3. The process of claim 2 wherein the displacement fluid comprises a slug of soluble oil, followed by a second fluid.

4. The process of claim 3 in which the second fluid contains a major portion of water.

5. The process of claim 4 in which the water of the second fluid is thickened by the addition of a thickening agent.

6. The process of claim 5 wherein the thickening agent is selected from the group consisting of partially hydrolyzed polyacrylamide, sugar, glycerin, starches carboxymethyl cellulose.

7. The process of claim 3 wherein the petroleum and water are displaced toward a producing well in said formation.

8. The process of claim 2 wherein a mobility buffer fluid is injected after said displacer fluid, and wherein said mobility buffer fluid has a lower mobility than said displacement fluid, said mobility being measured at the velocities to be encountered during the displacement process.

9. The process of claim 8 wherein the mobility buffer comprises a water-external emulsion.

10. The process of claim 1 wherein the petroleum and water are displaced toward a producing well in said formation.

11. The process of claim 1 wherein a mobility buffer fluid is injected after said displacer fluid, and wherein said mobility buffer fluid has a lower mobility than said displacement fluid, said mobility being measured at the velocities to be encountered during the displacement process.

12. The process of claim 11 wherein the mobility buffer comprises a water-external emulsion.

13. A process for the displacement of residual petroleum from petroleum-bearing formations from which a portion of the original petroleum has been displaced by other means, said formations having at least one injection means in said formation, said process comprising in combination the steps of:

(a) determining the relationship between total relative mobility of oil and water relative to water saturation for each of series of samples reasonably representative of the structure of the formation, (b) determining the water relative permeability at the zero oil relative permeability point (or at the existing water saturation of the reservoir) by transient reservoir injectivity tests, (c) selecting or interpolating from said total relative mobility vs. saturation relationship for said samples, the relationship most appropriate to the water relative permeability corresponding either to zero oil relative permeability as determined by said injectivity tests, or to the water relative permeability corresponding to the existing water saturation of the reservoir, (d) selecting the minimum mobility from said most appropriate relationship, (e) preparing a displacing fluid having a relative mobility not greater than said minimum total relative mobility under the conditions prevailing in the formation, (f) injecting said displacement fluid into said at least one injection means so as to displace water and petroleum present in the formation, said injection being controlled at such rates as to maintain the relative mobility of said displacement fluid below said minimum total relative mobility at substantially all points in said formation.

14. The process of claim 13 wherein said displacement fluid comprises a slug of soluble oil.

15. The process of claim 14 wherein the displacement fluid comprises a slug of soluble oil, followed by a second fluid.

16. The process of claim 15 in which the second fluid contains a major portion of water.

17. The process of claim 16 in which the water of the second fluid is thickened by the addition of a thickening agent.

18. The process of claim 17 wherein the thickening agent is selected from the group consisting of partially hydrolyzed polyacrylamide, sugar, glycerin, starches carboxymethyl cellulose.

19. The process of claim 15 wherein the petroleum and water are displaced toward a producing well in said formation.

20. The process of claim 14 wherein a mobility buffer fluid is injected after said displacer fluid, and wherein said mobility buffer fluid has a lower mobility than said displacement fluid, said mobility being measured at the velocities to be encountered during the displacement process.

21. The process of claim 20 wherein the mobility buffer comprises a water-external emulsion.

22. The process of claim 13 wherein the petroleum and water are displaced toward a producing well in said formation.

23. The process of claim 13 wherein a mobility buffer fluid is injected after said displacer fluid, and wherein said mobility buffer fluid has a lower mobility than said displacement fluid, said mobility being measured at the velocities to be encountered during the displacement process.

24. The process of claim 23 wherein the mobility buffer comprises a water-external emulsion.

25. A process for the simultaneous displacement of petroleum and water in formations bearing petroleum and water and having at least one injection means in said formation, the improvement comprising:

(a) determining the oil relative permeability relative to water saturation of at least one rock sample reasonably representative of the structure of the formation, (b) determining the water relative permeability in relation to water saturation of such samples, (c) calculating the total relative mobility of water and oil in relation to water saturation for each such sample, (d) determining from the mobilities of said samples the minimum total relative mobility reasonably likely to be encountered in the formation, (e) injecting into said formation a displacement liquid, said displacement liquid having a relative mobility not substantially greater than said minimum total relative mobility of oil and water under the conditions prevailing in the formation, (f) driving a slug of said displacing liquid through said formation with at least one secondary liquid, at least one of said secondary liquids comprising water, said secondary liquid having a mobility not substantially greater than said displacement liquid under substantially all of the conditions prevailing during said displacement.

26. A process for the simultaneous displacement of petroleum and water in formations bearing petroleum and water and having at least one injection means in said formation, the improvement comprising:

(a) determining the relationship between total relative mobility of oil and water relative to water saturation for each of a series of rock samples reasonably representative of the structure of the formation, (b) determining the water relative permeability at the zero oil relative permeability point (or at the existing water saturation of the reservoir) by transient reservoir injectivity tests, (c) selecting or interpolating from said total relative mobility vs. saturation relationships for said samples, the relationship most appropriate to the water relative permeability corresponding either to zero oil relative permeability as determined by said injectivity tests, or to the water relative permeability corresponding to the existing water saturation of the reservoir, (d) determining from the mobilities of said samples the minimum total relative mobility reasonably likely to be encountered in the formation, (e) injecting into said formation a displacement liquid, said displacement liquid having a relative mobility not substantially greater than said minimum total relative mobility of oil and water under the conditions prevailing in the formation, (f) driving a slug of said displacing liquid through said formation with at least one secondary liquid, at least one of said secondary liquids comprising water, said secondary liquid having a mobility not substantially greater than said displacement liquid under substantially all of the conditions prevailing during said displacement.

*27. A process for the simultaneous displacement of petroleum and water in formations bearing petroleum and water and having at least one injection means in said formation, comprising in combination the steps of:*

*(a) determining the oil relative permeability relative to water saturation of at least one rock sample reasonably representative of the structure of the formation,*

*(b) determining the water relative permeability in relation to water saturation of such samples,*

*(c) calculating the total relative mobility of water and oil in relation to water saturation for each such sample,*

*(d) determining from the mobilities of said samples the minimum total relative mobility reasonably likely to be encountered in the formation,*

*(e) preparing a displacing fluid having a relative mobility selected in accordance with said minimum total relative mobility to control fingering of said displacing fluid through the fluid to be displaced under the conditions prevailing in the formation,*

*(f) injecting said displacing fluid into at least one injection means so as to displace fluid in the formation.*

*28. A process for the displacement of residual petroleum from petroleum-bearing formations from which a portion of the original petroleum has been displaced by other means, said formations having at least one injection means in said formation, said process comprising in combination the steps of:*

*(a) determining the relationship between total relative mobility of oil and water relative to water saturation for each of series of samples reasonably representative of the structure of the formation,*

*(b) determining the water relative permeability at the zero oil relative permeability point (or at the existing water saturation of the reservoir) by transient reservoir injectivity tests,*

*(c) selecting or interpolating from said total relative mobility vs. saturation relationship for said samples, the relationship most appropriate to the water relative permeability corresponding either to zero oil relative permeability as determined by said injectivity tests, or to the water relative permeability corresponding to the existing water saturation of the reservoir,*

*(d) selecting the minimum mobility from said most appropriate relationship,*

*(e) preparing a displacing fluid having a relative mobility selected in accordance with said minimum total relative mobility to control fingering of said displacing fluid through the fluid to be displaced under the conditions prevailing in the formation,*

*(f) injecting said displacing fluid into at least one injection means so as to displace fluid in the formation.*

*29. The process of claim 27 wherein said displacement fluid comprises a slug of soluble oil.*

*30. The process of claim 27 wherein a mobility buffer fluid is injected after said displacer fluid, and wherein said mobility buffer fluid has a lower mobility than said displacement fluid, said mobility being measured at the velocities to be encountered during the displacement process.*

*31. The process of claim 28 wherein said displacement fluid comprises a slug of soluble oil.*

*32. The process of claim 28 wherein a mobility buffer fluid is injected after said displacer fluid, and wherein said mobility buffer fluid has a lower mobility than said displacement fluid, said mobility being measured at the velocities to be encountered during the displacement process.*

References Cited

The following references, cited by the Examiner, are of record in the patented file of this patent or the original patent.

UNITED STATES PATENTS

| | | | |
|---|---|---|---|
| 3,003,554 | 10/1961 | Craig et al. | 166—274 |
| 3,006,411 | 10/1961 | Holbrook | 166—273 |
| 3,044,544 | 7/1962 | Holbrook et al. | 166—273 |

| | | | |
|---|---|---|---|
| 3,148,730 | 9/1964 | Holbert | 166—274 |
| 3,167,118 | 1/1965 | Habermann | 166—252 |
| 3,208,517 | 9/1965 | Binder et al. | 166—274 |
| 3,221,810 | 12/1965 | Marx | 166—269 |
| 3,275,075 | 9/1966 | Gogarty et al. | 166—274 |
| 3,362,473 | 1/1968 | Foster | 166—273 |
| 3,369,601 | 2/1968 | Bond et al. | 166—273 X |

OTHER REFERENCES

Amyx, Bass and Whiting: Petroleum Reservoir Engineering Physical Properties, McGraw-Hill Book Co., Inc., 1960 (pp. 174–210).

STEPHEN J. NOVOSAD, Primary Examiner

U.S. Cl. X.R.

166—273